INVENTOR
M. E. MOHR
BY
Earl C. Laughlin
ATTORNEY

FREQUENCY DIVIDING CIRCUIT

Filed Sept. 9, 1948 3 Sheets-Sheet 2

INVENTOR
M. E. MOHR
BY
Earl C. Laughlin
ATTORNEY

Nov. 30, 1954 M. E. MOHR 2,695,959

FREQUENCY DIVIDING CIRCUIT

Filed Sept. 9, 1948 3 Sheets-Sheet 3

INVENTOR
M. E. MOHR
BY
Earl C. Laughlin
ATTORNEY

United States Patent Office 2,695,959

Patented Nov. 30, 1954

2,695,959

FREQUENCY DIVIDING CIRCUIT

Milton E. Mohr, New Providence, N. J., assignor to Bell Telephone Laboratories, Incorporated, New York, N. Y., a corporation of New York Application September 9, 1948, Serial No. 48,494

12 Claims. (Cl. 250—36)

The present invention relates to the use of a multivibrator as a frequency divider and has as its object improved accuracy and stability of operation.

It is also an object of the invention to extend the range of operation of a multivibrator frequency dividing stage to higher ratios with stability of operation.

The invention also permits of change in the frequency dividing ratio from one value to another, during operation, in an accurately controllable manner.

In accordance with this latter feature, it is an object of the invention to produce by means of a frequency dividing multivibrator a wave whose frequency is accurately related from instant to instant to a succession of input or control voltages which may be representative of different magnitudes of a signal or control wave.

Figure 1:
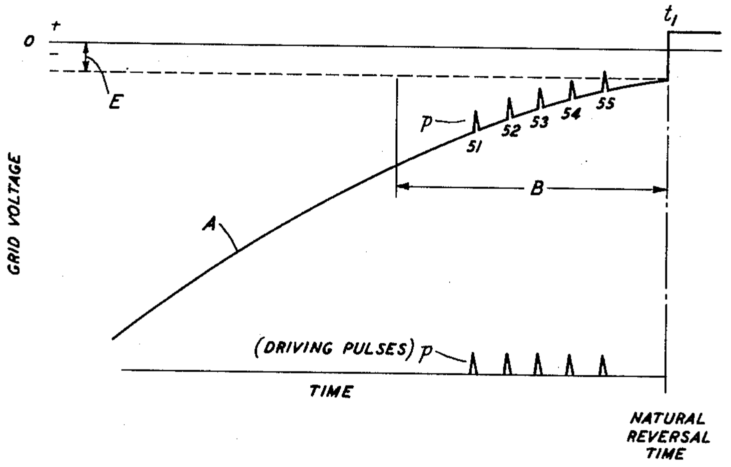

These and other objects and features of the invention will appear more clearly from the following detailed description and from the accompanying drawing in which Fig. 1 shows graphs illustrating the operation of a multivibrator and Fig. 2, 2A, 2B and 2C, 2D and 3 are schematic circuit diagrams of a circuit embodying the invention and modifications thereof.

The familiar multivibrator in wide usage as a generator of waves, as a frequency stepdown circuit, as a frequency modulator etc., operates, as is well known, by an exchange of voltages between the plate of either side and the grid of the other side through condenser-resistance circuits whose time constants, in the case of a free running multivibrator, govern the rate of exchange of these voltages. In a controlled multivibrator a pulse is fed into the circuit at a time just ahead of the time when the circuit would undergo a reversal if controlled entirely by its own timing circuits as an independent generator of pulses. There is a part of a cycle slightly in advance of the natural reversal time when the voltages in the circuit which determine the instant of reversal are approaching the critical condition for reversal. This is the well-known region within which the circuit is readily controllable, in that a pulse introduced from an outside source during this portion of the cycle instantly carries the voltage on one of the two tubes up to the critical condition causing the circuit to reverse at the time the pulse is introduced instead of at the slightly later, normal, time when it would reverse if left entirely to the control of its own timing circuits.

Referring to Fig. 1, curve A represents a portion of the grid voltage curve of one side of a multivibrator and region B represents the range within which the multivibrator may be readily controlled, this region being somewhat arbitrarily chosen from considerations of the amplitude of the available driving pulses and other circuit factors. Time $t_1$ indicates the natural reversal time of the multivibrator. Just before time $t_1$ (to the left of $t_1$) curve A is rising toward the critical grid voltage E at which the tube is triggered. A series of pulses $p$ is assumed to be fed into the circuit and a few of these appear superposed on curve A. These are arbitrarily assumed to be the 51st to the 55th pulses of a periodic succession, number 0 of which series was at the next previous reversal time of the multivibrator. Under the somewhat idealized conditions represented in Fig. 1 it is seen that the 55th pulse will trigger the circuit while the 54th pulse will just fail to trigger the circuit since it does not carry the grid voltage quite up to the critical value E. The output of the multivibrator will under these conditions consist of one pulse for each 55 of the driving pulses and the circuit is therefore operating to step the input frequency down in the ratio of 55 to 1.

It should be observed here that the pulses applied to the opposite grid of the multivibrator are in this case spaced in between the pulses shown in Fig. 1. If the two sides of the multivibrator are adjusted to approximate equality of timing then the operation of the opposite tube from that for which the grid voltage is shown in Fig. 1 will be at pulse 27½ on the time frame of Fig. 1. It should be understood, however, that unequal adjustments can be used as well, i. e., the operation of the other tube could well be at 22½, 23½, 24½, 25½, 28½, 29½ or any other half interger not too far removed from 27½ while suitable adjustments are made on the tube shown to cause it to continue to operate on the 55th pulse.

If any variables occurred in the circuit, either intentionally or unintentionally such as to lift the curve A slightly, or to increase the pulse heights, it is seen that one of the earlier pulses such as number 54, number 53 or an even earlier one would trigger the circuit since it would carry the grid voltage up to the critical value. If this predicated change affects the grid curves on both tubes of the stepdown multivibrator, then whenever an earlier pulse caused operation of one tube such action would also occur on the other tube and it is seen that the stepdown ratio would change in steps of two and would become 55, 53, 51 or if an even ratio had been chosen such as 56 the ratio would be changed to 54, 52, etc.

If the circuit is to be used as an accurate frequency divider with a large stepdown ratio (driving pulses close together) it is important to prevent variables from occurring which would permit any but a given pulse, such as No. 55, from causing a reversal; for if pulse 54, for example, were to trigger the circuit the ratio would, for that reversal, correspond to a value of 54 instead of 55.

Heretofore in the use of multivibrators the positive pips which trip the circuit by making the grid of one of the tubes more positive have been the resultant of two effects, one the positive driving pulse received from the external source and the other the positive pulse fed across from the plate of the opposite tube due to the partial cutting off of that tube by a negative pulse impressed on the grid of that tube from the external driving source. This was because the driving pulses consisted of alternately positive and negative pulses, the positive pulse on one side of the circuit occurring at the same time as the negative pulse on the oppostie side of the circuit.

In attempting to obtain high stepdown ratios in a multivibrator frequency divider applicant has discovered in accordance with this invention that these negative pulses give rise to variable effects which tend to cause the positive pulses $p$ represented in Fig. 1 to have variable amplitude, thus introducing uncertainties in the operation of the circuit and causing it to divide in variable ratios. Applicant conceived the idea of eliminating the negative driving pulses entirely and using only the positive driving pulses as a means of increasing the accuracy and extending the usable range of frequency division of a multivibrator circuit. This has proved in practice to be effective and capable of producing new orders of accuracy and stability and to permit higher ratios of frequency division to be used.

If pulses are fed into the multivibrator in opposite phase, as heretofore, from a push-pull driving stage, the negative pulse that is impressed on, say, the lower multivibrator tube at the same time as the positive pulse which triggers the upper tube, has the effect of reducing the plate current of this lower tube from a saturation value to some value below complete saturation. The lower tube amplifies this pulse, reverses its phase and applies it to the upper tube at the time the positive driving pulse is also being supplied to the upper tube. In practice this positive pulse resulting from amplification of the impressed negative pulse by the lower tube may be stronger than the positive pulse from the driving stage, and this has been considered in the past as an advantage in the operation of multivibrators.

Applicant has found, however, that the action of the saturated tube in amplifying this negative pulse is quite variable and results in an amplified pulse of variable amplitude due to the variation of the grid-cathode impedance of the saturated tube, and due to the variation of the gain of this tube in this condition. Also the gain varies greatly from tube to tube when the tubes operate under conditions of saturation. These variables are sufficient to make the operation unstable where large frequency dividing ratios are sought after. Applicant has found however, that by using only the positive driving pulses, this source of unstability can be eliminated and the circuit operation greatly improved.

This is true whether the circuit is to be operated with a fixed frequency dividing ratio or is to have its dividing ratio purposely changed during operation, by changing the positive grid bias voltage. When operated according to this invention, the circuit is controllable with accuracy and stability through definite frequency levels in reproducible manner with rising and falling bias voltage.

Figure 2D:
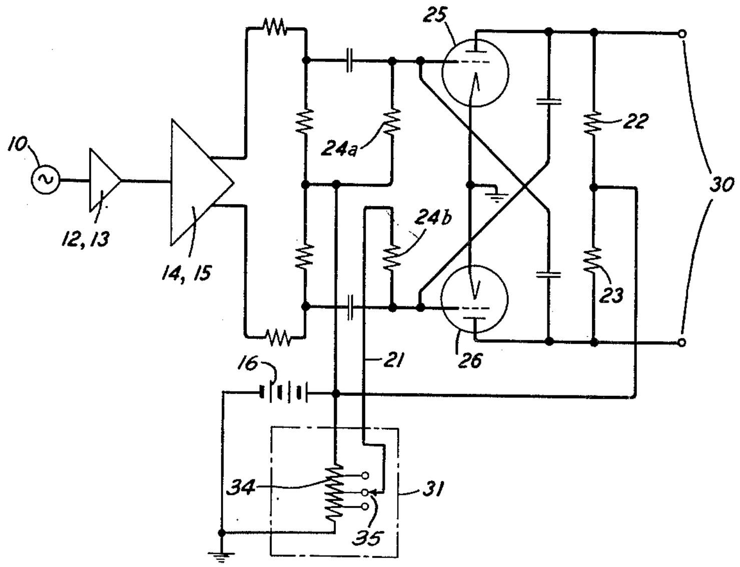
Figure 2:
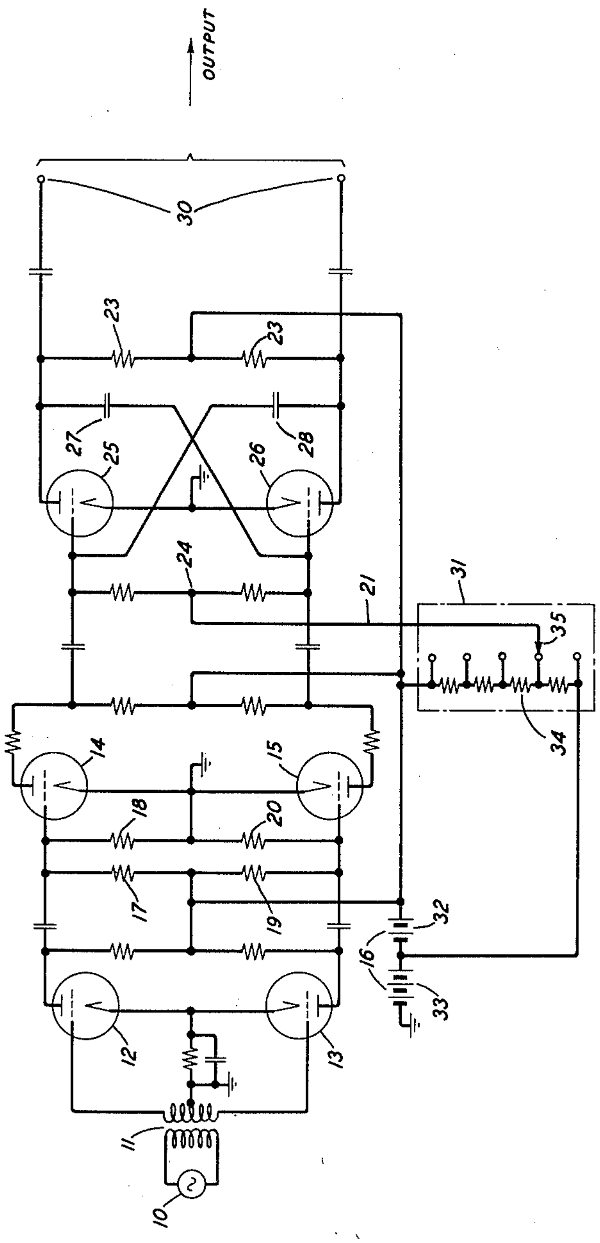

Referring to Fig. 2, a frequency dividing multivibrator stage consisting of tubes 25 and 26 is shown driven by positive pulses in accordance with the invention. The original high frequency source is shown at 10 and may be a source of highly constant frequency such as a vacuum tube oscillator controlled by a crystal, by way of example. Waves from the source 10 are impressed through input transformer 11 to the grids of the push-pull amplifier stage including tubes 12 and 13, the amplified output of which is impressed on the grids of the positive pulse generator stage comprising tubes 14 and 15. The grids of the tubes 14 and 15 are biased positive by plate battery 16 which is shown connected to a potentiometer comprising resistors 17 and 18 for deriving a positive bias for the grid of tube 14 and to potentiometer resistances 19 and 20 for deriving a positive bias for the grid of tube 15.

The positive grid bias voltage on tubes 14 and 15 is sufficiently high to prevent a change in the plate current of those tubes in response to receipt from the amplifier stage 12, 13 of positive pulses but to permit the negative pulses impressed on the grids of tubes 14 and 15 to drive these tubes beyond cut-off. In this way only positive pulses are produced in the output circuits of the tubes 14 and 15.

The multivibrator stage comprising tubes 25 and 26 is of standard configuration including the cross-connecting condensers 27 and 28 between the plate of one tube and the grid of the opposite tube. The values of the capacities of these condensers are adjusted in known manner in relation to the values of the resistances 22 and 23 to provide the desired time constant for the multivibrator. Where a large frequency dividing ratio is desired, these time constants should be adjusted to give the multivibrator a natural frequency which is many times lower than the frequency of the waves from source 10. It is entirely feasible in the practice of the present invention to obtain in a single frequency dividing stage a reduction in frequency of fifty-fold or a hundred-fold, or even greater, by way of example. A positive bias is obtained from the plate battery 16 which comprises the two sections 32, 33, by lead 21 extending to the center point 24 of the grid resistors of the multivibrator.

In the operation of the circuit of Fig. 2 the grid bias voltage on the multivibrator stage may be left at a fixed value where a fixed frequency dividing ratio is desired. In this case the slider 35 to which lead 21 is connected is moved to the lowermost tapping point on the resistor 34 so that the fixed portion 33 of the grid bias battery is furnishing a fixed positive bias voltage to the multivibrator grids. This fixed bias determines the position of the curve A of Fig. 1 and may be chosen by trial or otherwise to have the best value for the frequency dividing ratio that is to be used in any particular case. By proper choice of the positive grid bias and by supplying to the multivibrator stage only positive driving pulses from the driving stage 14, 15 it is found in accordance with the invention that the multivibrator stage can be operated with very large frequency dividing ratios and with a high degree of stability.

Where it is desired to change the frequency dividing ratio of the multivibrator during operation, or in changing from one use to another, the slider 35 is set to different points along the potentiometer resistance 34 so as to vary the positive bias applied to the multivibrator grids. This has the effect of varying the position of the curve A of Fig. 1. As the grid bias is increased the frequency dividing ratio is decreased resulting in a higher output frequency for a given frequency of input wave.

In Fig. 2D, the over-all circuit may be the same as in Fig. 2, source 10 feeding through the intermediate driving stages 12, 13 and 14, 15 to the multivibrator stage 25, 26. Instead of connecting lead 21 to apply variable positive bias to the grids of both tubes 25 and 26, however, as in Fig. 2, a constant bias is fed from battery 16 to the grid of tube 25 through resistor **24*a* in Fig. 2D while a variable bias is supplied to only the grid of tube 26, from potentiometer resistor 34 by way of lead 21 and resistor 24*b*. With this type of connection, when the bias fed over lead 21** is varied, the step-down frequency ratio is changed from normal value $n$, through successive values $n-1$, $n-2$, etc. whereas in Fig. 2 the ratio would be changed only through successive values $n-2$, $n-4$, $n-6$, etc.

Figure 2C:
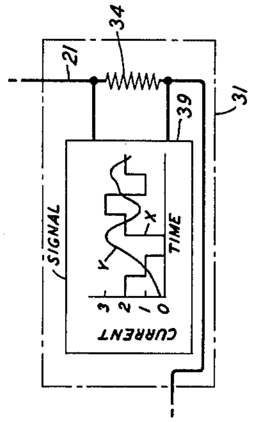
Figure 2B:
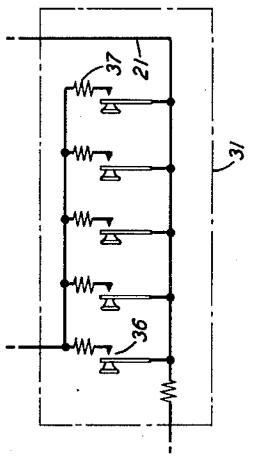
Figure 2A:
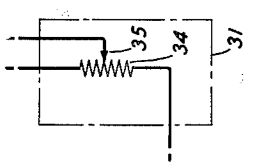

Figs. 2A, 2B and 2C show different types of bias control circuits enclosed in dotted rectangles 31, any one of which may be substituted for the control circuit in the rectangle 31 of Fig. 2 or 2D. In the circuit of Fig. 2A the positive control bias may be changed in a continuous manner by moving slider 35 along resistor 34, instead of in discrete steps as in Fig. 2.

If the frequency of the source 10 in Fig. 2 is $f$, this being also the frequency of the positive driving pulses for the tubes 25 and 26, let it be assumed that with only the battery 33 used as bias source the output frequency at 30 is $f/n$. As the slider 35 is moved upward in Fig. 2, when the latter is modified by substituting the control circuit of Fig. 2A for the control circuit in the rectangle 31 of Fig. 2, the positive bias is increased and the dividing ratio will be changed through successive values $n$, $n-2$, $n-4$, etc. The taps on resistor 34 in Fig. 2, unmodified, may be chosen to correspond to each one of these successive ratios or only to chosen ratios. All possible integral ratios, within a suitable range, can be had with the arrangement of Fig. 2D modified per Fig. 2A.

Fig. 2B shows a type of control suitable for a signal which is variable in steps. Each step of signal value corresponds to a separate key 36 (of which five are shown for illustration). Each key is connected through series resistor 37 to lead 21. The connection that includes no key in the figure corresponds to the lowest output frequency, each key when closed giving a different output frequency, assuming resistances 37 are individually dimensioned for different frequencies.

Instead of using a tapped battery or potentiometer resistance for obtaining the variable control bias, a signal voltage source 39 may be connected to impress variable positive voltage on lead 21 as in Fig. 2C. This signal voltage may vary continuously through a range of positive values as shown, for illustration, by curve Y of the graph in Fig. 2C; or the signal may vary from one to another of several definite values as illustrated by graph X.

One advantage of the invention in the transmission of signals having definite values such as represented at X is that, where the signal values differ by equal increments, as in some types of telegraphy, for example, small errors in signal value are automatically compensated in the frequency modulating process since the output frequency can vary only in accordance with dividing ratios that are represented by successive integers, $n$, $n-1$, etc. for the circuit of Fig. 2D. The circuit of Fig. 2 would allow ratios of $n$, $n-2$, $n-4$, $n-6$, etc.

As an illustrative example of a design of a system making use of the circuit of Fig. 2D, in which the modulating wave has the form X of Fig. 2C, the frequency of the driving pulses for the tubes 14 and 15 may be 202,000 cycles per second and the nominal dividing ratio, $n$, may be 101. The lowest frequency of output corresponding to step 0 is then 2,000 cycles per second. When the signal rises in value from 0 to unity value, the dividing ratio changes from 101 to 100, giving an output frequency of 2020 cycles per second. The different frequencies corresponding to the different increments of signal value are further given by the following table.

| Signal Value | Output Frequency, c. p. s. | Step Increment, c. p. s. | Ratio of Step Increment to First Increment |
|---|---|---|---|
| 0 | 2,000.00 | | |
| 1 | 2,020.00 | 20.00 | 1.000 |
| 2 | 2,040.40 | 20.40 | 1.020 |
| 3 | 2,061.22 | 20.82 | 1.041 |

This design was worked out to give a nominal step value of 20 cycles per second in the output wave. The last column shows that the greatest departure is in the highest frequency step and this order of error for many purposes is not excessive. Since the step error is systematic and progressive with frequency it can be compensated, if desired, in the receiver output. This design is not to be construed as limiting but rather as merely by way of illustrative example.

If the circuit of Fig. 2 is used then, as pointed out before, the ratios will change by integers of two, such as $n$, $n-2$, $n-4$, etc. The table shown would then apply if the initial frequency $f$ were chosen 404,000 cycles per second and the nominal dividing ratio were made 202. Thus, in the no-signal condition tube 25 of Fig. 2 could remain at saturation for 100½ input waves while tube 26 would remain saturated for 101½ input waves. Each step input serves to reduce each of these periods by one high frequency cycle thereby reducing the stepdown ratio by two. Thus the performance will be identical with that previously described by the foregoing table.

Figure 3:
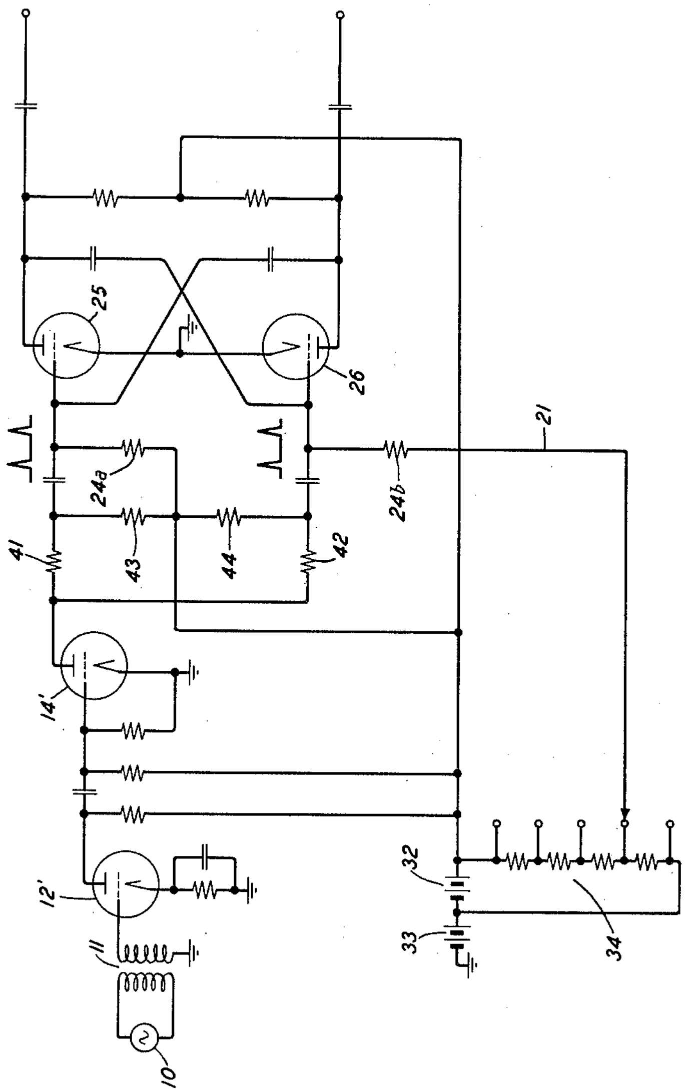

Fig. 3 illustrates a case in which the positive pulses for driving the tubes 25 and 26 of the step-down multivibrator are applied to the grids of the two sides of the multivibrator simultaneously instead of alternately, first to one grid and then to the other. For this purpose single-sided driving stages 12' and 14' instead of push-pull stages are used. Two parallel paths are taken off the plate of tube 14' through series resistors 41 and 42, respectively, to the grids of the tubes 25, 26. In this circuit, as in the case of Fig. 2D, a fixed bias is supplied to the grid of tube 25 via resistor 24*a* while the control bias for enabling change in frequency dividing ratios is supplied over resistor 24*b* to the grid of Fig. 26.

In Fig. 3, each tube 25, 26 will remain saturated a whole number of driving pulse cycles instead of a length of time measured in half integers. The pulse has no effect on the tube already saturated, but the simultaneous pulse on the opposite tube causes reversal of the circuit.

Pentode or other suitable type tubes may be used in place of the triodes shown.

The invention is not to be construed as limited to the specific disclosure either as to circuit details or magnitudes mentioned but variations and modifications may be made within the scope of the claims.

What is claimed is:

1. A frequency dividing multivibrator comprising a first tube and a second tube each having a grid and a plate, the grid of each tube being cross-connected to the plate of the other, a source of driving pulses having a frequency many times higher than the natural frequency of said multivibrator, means to derive from said source a first train of pulses all of positive polarity, means to derive from said source a second train of pulses all of positive polarity and interleaved in time with the pulses of said first train, means to apply said first train of pulses only to the grid of said first tube, and means to apply said second train of pulses only to the grid of said second tube.

2. The combination in accordance with claim 1 and frequency determining means for said multivibrator comprising a source of positive bias voltage for said multivibrator, means for applying said positive bias voltage to said grids, and means to vary the frequency dividing ratio of said multivibrator through successive integral number values comprising means to vary the positive bias voltage on one of said grids.

3. The combination in accordance with claim 1 and a source of signals, a source of positive bias voltage, means for applying said positive bias voltage to said multivibrator, and means for changing the frequency dividing ratio of said multivibrator which comprise means for varying said bias voltage in accordance with said signals.

4. The combination in accordance with claim 3 wherein said last-named means comprise means for biasing said bias voltage abruptly from one value to another in accordance with said signals.

5. The combination in accordance with claim 1 wherein said driving pulses have a frequency which is at least several times 10 greater than the natural frequency of said multivibrator.

6. A frequency dividing circuit comprising a source of high frequency driving pulses of high constancy of frequency, a multivibrator comprising a first pair of grid controlled tubes each having a plate and each having its grid cross-connected to the plate of the other, and a coupling stage for applying only positive driving pulses from said source to said multivibrator, said coupling stage comprising a third grid controlled tube having a plate, means for applying said driving pulses to the grid of said third tube, means for applying the output of said third tube to said multivibrator, and means for applying to said third grid controlled tube a positive grid bias voltage of such value as to permit only positive pulses to be applied from said third grid controlled tube to said multivibrator.

7. The combination in accordance with claim 6 wherein said coupling stage comprises a second pair of grid controlled tubes, means for applying pulses out of phase from said source to the grids of said second pair of tubes, means for applying the output of a first of said second pair of tubes to the grid of a first of said first pair of tubes, means for applying the output of a second of said second pair of tubes to the grid of a second of said first pair of tubes, and means for applying to each tube of said second pair of tubes a grid bias voltage having a magnitude to permit only positive pulses to be applied from said second pair of tubes to said first pair of tubes.

8. The combination in accordance with claim 6 and a source of positive bias voltage, means for applying said positive bias voltage to the grids of said pair of grid controlled tubes, and means for varying the frequency of the output current of said multivibrator from $$\frac{f}{n} \text{ to } \frac{f}{n}+m$$

where $n$ is an integer greater than unity and $m$ has successive values 2, 4, 6, etc., said last-named means comprising means to vary said positive bias voltage.

9. In combination, a source of driving pulses alternately positive and negative, a frequency dividing multivibrator comprising a pair of cross-connected amplifiers each having a control electrode, a push-pull driving stage for applying pulses from said source to said control electrodes, and a coupling stage interposed between said driving stage and said multivibrator for blocking the application of said negative pulses to said multivibrator.

10. The combination in accordance with claim 9 and means for applying a positive bias voltage to said control electrodes, a source of modulating signals, and means for varying said positive bias in accordance with said modulating signals.

11. The combination in accordance with claim 10 wherein said last-named means comprises means for varying the positive bias on only one of said control electrodes in accordance with said modulating signals.

12. The combination in accordance with claim 9 wherein the repetition rate of said driving pulses is at least several times 10 greater than the natural frequency of said multivibrator.

References Cited in the file of this patent

UNITED STATES PATENTS

| Number | Name | Date |
|---|---|---|
| 2,237,668 | Hermann | Apr. 8, 1941 |
| 2,278,658 | Kroger | Apr. 7, 1942 |
| 2,392,114 | Bartelink | Jan. 1, 1946 |
| 2,416,201 | Nagel | Feb. 18, 1947 |
| 2,425,314 | Hansell | Aug. 12, 1947 |
| 2,484,611 | Davis | Oct. 11, 1949 |

FOREIGN PATENTS

| Number | Country | Date |
|---|---|---|
| 456,840 | Great Britain | Nov. 12, 1936 |

OTHER REFERENCES

The Degenerative Positive-Bias Multivibrator, by S. Bertram, Proc. of IRE, vol. 36, No. 2, February 1948.

Alfven, Proc. Physical Society of London, vol. 50 (1938), pages 358–9.